US012145809B2

(12) United States Patent
Ziegler et al.

(10) Patent No.: US 12,145,809 B2
(45) Date of Patent: Nov. 19, 2024

(54) TRANSPORT SYSTEM AND METHOD FOR TRANSPORTING A PLURALITY OF CONTAINERS

(71) Applicant: Syntegon Technology GmbH, Waiblingen (DE)

(72) Inventors: Jochen Ziegler, Satteldorf (DE); Maik Täger, Fichtenau (DE); Sebastian Hachtel, Waiblingen (DE)

(73) Assignee: Syntegon Technology GmbH, Waiblingen (DE)

( * ) Notice: Subject to any disclaimer, the term of this patent is extended or adjusted under 35 U.S.C. 154(b) by 69 days.

(21) Appl. No.: 18/183,504

(22) Filed: Mar. 14, 2023

(65) Prior Publication Data

US 2023/0303341 A1  Sep. 28, 2023

(30) Foreign Application Priority Data

Mar. 23, 2022 (DE) ...................... 10 2022 106 818.8

(51) Int. Cl.
*B65G 47/82* (2006.01)
*B65G 27/08* (2006.01)
*B65G 47/08* (2006.01)

(52) U.S. Cl.
CPC ............ *B65G 47/82* (2013.01); *B65G 27/08* (2013.01); *B65G 47/088* (2013.01); *B65G 2201/0244* (2013.01)

(58) Field of Classification Search
CPC ...... B65G 47/082; B65G 47/82; B65G 27/08; B65G 47/088; B65G 2201/0244

(Continued)

(56) References Cited

U.S. PATENT DOCUMENTS 3,237,365 A * 3/1966 Koulakoff ............... B65B 35/44
198/623
4,029,198 A * 6/1977 Lingl, Jr. ............... B65G 47/32
198/419.1

(Continued)

FOREIGN PATENT DOCUMENTS

DE  102016203778 A1  9/2017
DE  102016109435 A1  11/2017

(Continued)

OTHER PUBLICATIONS

German Patent Office Action for Related Application No. 102022106818.8 dated Nov. 17, 2022 (8 pages, including an English statement of relevance).

(Continued)

*Primary Examiner* — James R Bidwell
(74) *Attorney, Agent, or Firm* — Michael Best & Friedrich LLP

(57) ABSTRACT

A transport system for a plurality of containers includes a feed device for a supply of containers which, at a transfer end of the feed device, can be received by a receiving region of a working platform of a transport mover. For the purpose of movement in a working plane, the transport mover has a drive section which is connected to the working platform and which interacts with a stationary, planar drive plane. The working platform has a blocking surface, the distance of which from the drive plane can be changed by movement of the drive section of the transport mover relative to the drive plane.

15 Claims, 6 Drawing Sheets

(58) Field of Classification Search
USPC .................................... 198/419.1, 427, 429
See application file for complete search history.

(56) References Cited

U.S. PATENT DOCUMENTS

| | | | | |
|---|---|---|---|---|
| 4,173,277 | A | * | 11/1979 | Zimmerman ........ B65G 47/082 198/774.3 |
| 6,889,485 | B2 | * | 5/2005 | Davaillon ............ B65G 47/845 53/448 |
| 2010/0193327 | A1 | | 8/2010 | Mougin et al. |
| 2015/0063971 | A1 | * | 3/2015 | Beer ....................... B65B 35/44 198/469.1 |
| 2015/0068870 | A1 | | 3/2015 | Beer et al. |
| 2022/0035345 | A1 | | 2/2022 | Scherl et al. |
| 2023/0303341 | A1 | * | 9/2023 | Ziegler ................ B65G 47/088 |

FOREIGN PATENT DOCUMENTS

| | | | |
|---|---|---|---|
| DE | 102018105807 A1 | 9/2019 | |
| EP | 1847488 A1 * | 10/2007 | ........... B65G 47/088 |
| EP | 3656707 A1 | 5/2020 | |
| WO | 2016102417 A1 | 6/2016 | |

OTHER PUBLICATIONS

European Patent Office Extended Search Report for U.S. Appl. No. 23/158,926 dated Aug. 21, 2023 (6 pages including partial English translation).

* cited by examiner

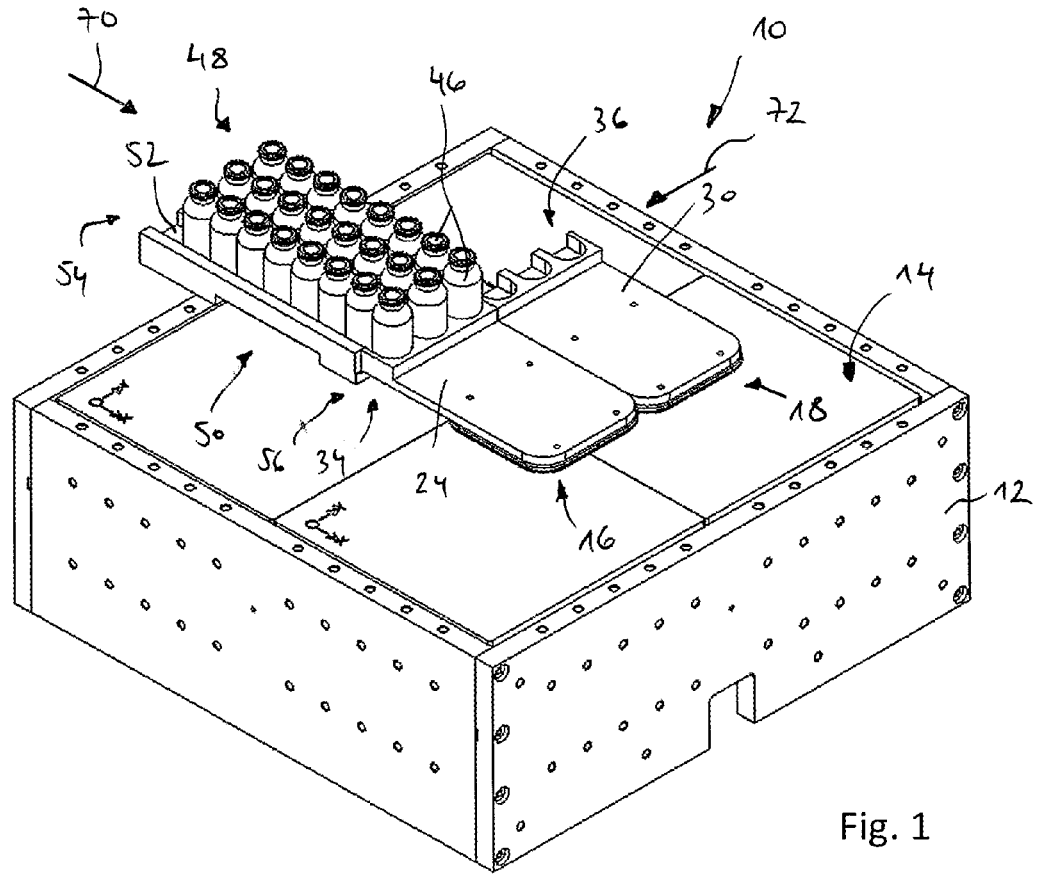
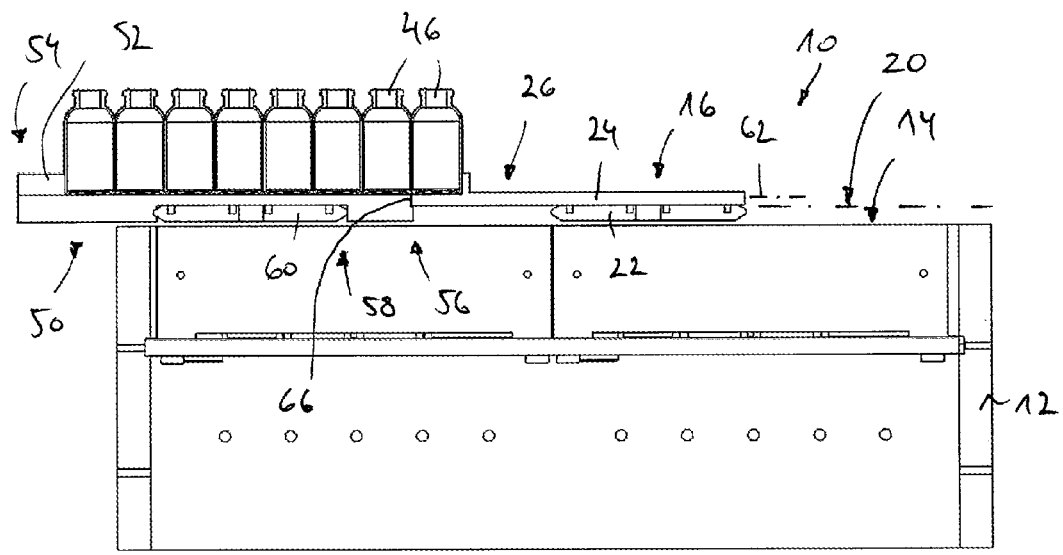

TRANSPORT SYSTEM AND METHOD FOR TRANSPORTING A PLURALITY OF CONTAINERS

BACKGROUND

The invention relates to a transport system for a plurality of containers, comprising a feed device for a supply of containers which, at a transfer end of the feed device, can be received by a receiving region of a working platform of a transport mover, wherein, for the purpose of movement in a working plane, the transport mover has a drive section which is connected to the working platform and which interacts, in particular contactlessly, with a stationary, planar drive plane. The invention furthermore relates to a method for transporting a plurality of containers.

Various transport systems are known from DE 10 2018 105 807 A1, DE 10 2016 203 778 A1, DE 10 2016 109 435 A1, US 2015/0 068 870 A1 and from US 2010/0 193 327 A1.

SUMMARY

The invention is based on the object of proposing a transport system which is constructed as simply as possible and a method, which can be carried out as simply as possible, for transporting a plurality of containers.

This object is achieved in the case of a transport system of the type mentioned at the beginning in that the working platform has a blocking surface, the distance of which from the drive plane can be changed by movement of the drive section of the transport mover relative to the drive plane, wherein, in a transfer position associated with a smaller distance from the drive plane, the blocking surface is arranged at such a low level that transfer of containers from the transfer end of the feed device beyond the blocking surface into or onto the receiving region of the working platform is made possible, and wherein, in a blocking position associated with a greater distance from the drive plane, the blocking surface blocks transfer of containers from the transfer end of the feed device into or onto the receiving region of the working platform.

The transport system according to the invention makes it possible to temporarily block a supply of containers by the blocking edge of the working platform being transferred from a transfer position into a blocking position. This transfer is accompanied by a movement of the drive section of the transport mover; this movement is transmitted via the working platform to the blocking surface. This makes it possible to be able to dispense with an additional blocking surface actuator for producing a movement of the blocking surface relative to the working platform.

The change in the distance of the blocking surface from the drive plane is accompanied, for example, by a vertical movement of the transport mover along a vertical axis of the transport mover with respect to the drive plane. This distance corresponds to a free gap which is formed between the drive section of the transport mover and the drive plane and is adjustable at least via a stroke of a few millimeters.

It is particularly preferred if the change in the distance of the blocking surface from the drive plane is accompanied by a tilting movement of the transport mover along a tilting axis of the transport mover parallel to the drive plane. Such a tilting function of a transport mover is known per se and is used according to the invention to change the distance of the blocking surface from the drive plane, in particular over a movement path between the transfer position and blocking position, which movement path is enlarged in comparison to a movement only along a vertical axis of the transport mover.

The working platform preferably extends in a plane, wherein the blocking surface is oriented at an angle, in particular perpendicularly, to the plane. This permits a compact and simple design of the transport mover.

In particular, it is preferred that the blocking surface is a boundary surface of the working platform. This permits particularly simple provision of the blocking surface, which is in particular an integral part of the working platform. In addition, a stable and insensitive blocking surface formed and supported by a working platform body can be provided.

It is furthermore preferred if the working platform has a cantilever region which extends over the drive section and on which the blocking surface is arranged. During a tilting movement of the transport mover about a tilting axis which is parallel to the blocking surface and is spaced apart from the blocking surface, an enlarged movement path of the blocking surface between the transfer position and the blocking position can be provided in this way. In the blocking position of the blocking surface, this leads to a supply of containers being able to be particularly reliably blocked.

A further embodiment makes provision that the receiving region has a receiving surface on which the containers can be disposed, and in that the blocking surface is adjacent to the receiving surface. In this way, a blocking effect of the blocking surface can be provided directly adjacent to the receiving region of the transport mover.

It is preferred that the blocking surface and the receiving surface are oriented at an angle to each other, in particular perpendicularly to each other. This permits a space-saving separation possibility between containers which are already disposed in or on the receiving region and containers which are still part of the supply of containers.

It is furthermore preferred that the receiving region has delimitations for receiving separated containers, as a result of which gentle transport of containers arranged on the transport mover is permitted.

In particular, the receiving region permits the receiving of a row of containers, with an orientation of the row extending transversely, in particular perpendicularly, to a supply axis along which the supply of containers is fed to the receiving region.

It is furthermore preferred that the feed device has a vibration device for transporting the containers in the direction of the transfer end. This permits a simple and gentle transport of a plurality of containers, with the feed device being able to remain arranged in a stationary manner.

Furthermore, it is possible that the feed device is arranged on an additional mover which is independent of the transport mover and which interacts with the stationary, planar drive plane. This permits a change in the position of the supply of containers relative to the drive plane. Alternatively or additionally thereto, it is possible for the transport mover to provide the abovementioned vibration device, which can be realized, for example, by an oscillating change in the relative position of the additional mover relative to the drive plane. A high-frequency movement only along a vertical axis of the additional mover and/or movements about a tilting axis of the additional mover parallel to the drive plane are conceivable.

In a particularly simply configured feed device, the latter is designed as a conveying channel or has at least one conveying channel, in particular in the event that the supply of containers is fed to the receiving region of the transport mover in mutually parallel rows of containers.

It is particularly preferred that the transport system has a further transport mover, wherein the containers can be received by a receiving region of a working platform of the further transport mover, wherein, for the purpose of movement in the working plane, the further transport mover has a drive section which is connected to the working platform and which interacts, in particular contactlessly, with the stationary, planar drive plane, wherein the working platform has a blocking surface, the distance of which from the drive plane can be changed by movement of the drive section of the further transport mover relative to the drive plane, wherein, in a transfer position associated with a smaller distance from the drive plane, the blocking surface is arranged at such a low level that transfer of containers from the transfer end of the feed device beyond the blocking surface into or onto the receiving region of the working platform is made possible, and wherein, in a blocking position associated with a greater distance from the drive plane, the blocking surface blocks transfer of containers from the transfer end of the feed device into or onto the receiving region of the working platform.

The use of a further transport mover which likewise has a blocking surface, the position of which can be changed between a transfer position and a blocking position, permits an even more flexible use of the transport system, in particular in conjunction with a method described below for transporting a plurality of containers.

The object mentioned at the beginning is also achieved by a method for transporting a plurality of containers, which method comprises the features of the further independent method claim.

When a plurality of transport movers are used, it is possible that, at least in a transition state, transfer of containers from the transfer end into or onto the receiving region of the working platform is blocked by a plurality of adjacently arranged blocking surfaces of different transport movers. This has the advantage that a working platform already filled with containers can be removed from the transfer end of the feed device, wherein the blocking surface of a further transport mover simultaneously takes over the blocking position of the blocking surface of the already filled transport mover and blocks a further supply of containers until the blocking surface of the further transport mover is transferred into its transfer position.

BRIEF DESCRIPTION OF THE DRAWINGS

Further features and advantages of the invention are the subject matter of the following description and the graphical illustration of exemplary embodiments.

In the drawing

FIG. 1 shows a perspective view of an embodiment of a transport system;

FIG. 2 shows a side view of the transport system according to FIG. 1;

DETAILED DESCRIPTION

Figure 3:
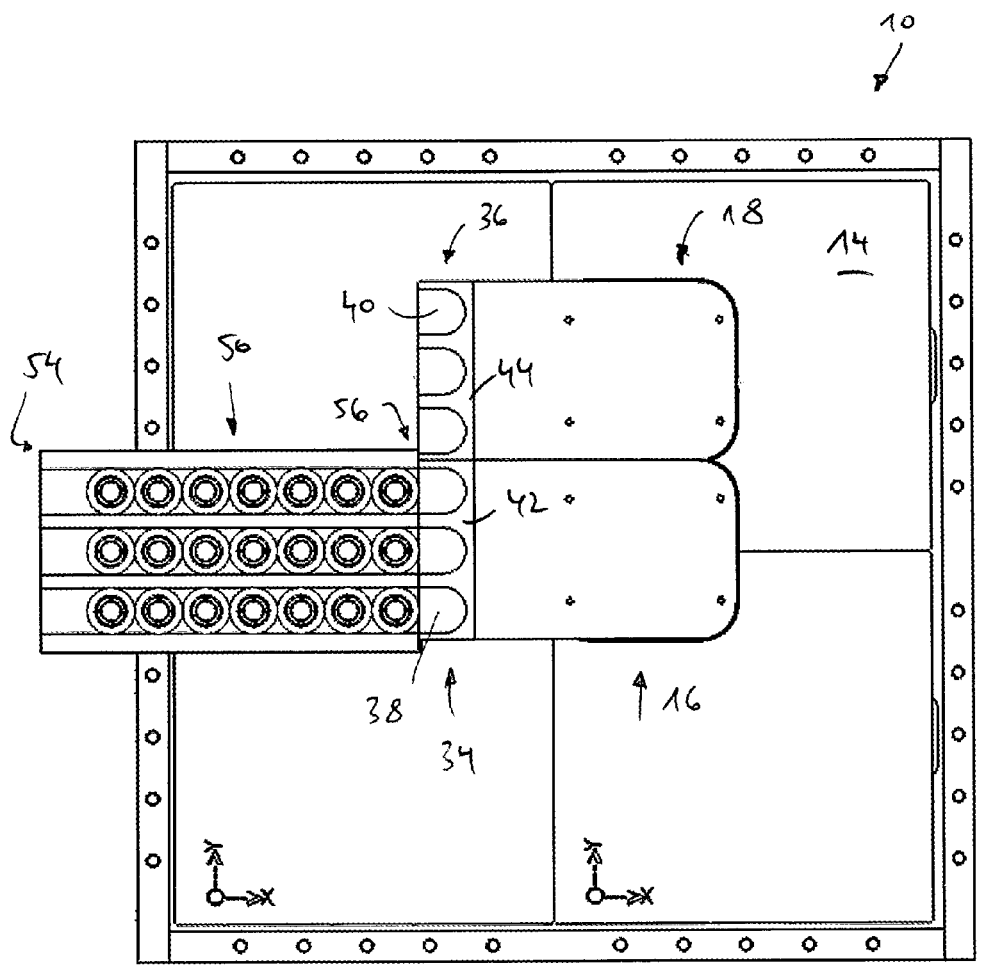
FIG. 3 shows a top view of the transport system according to FIG. 1 in a first transport phase.

An embodiment of a transport system is denoted overall in the drawing by the reference sign 10. The system 10 comprises a stationary drive unit 12 with a stationary, planar drive plane 14. The drive plane 14 serves for contactlessly driving a transport mover 16 and a further transport mover 18 within a working plane 20 parallel to the drive plane 14, compare FIG. 2.

The transport mover 16 has a drive section 22 which bears a working platform 24. The working platform 24 particularly preferably has a cantilever region 26 which protrudes over the drive section 22, compare FIG. 2.

Figure 12:
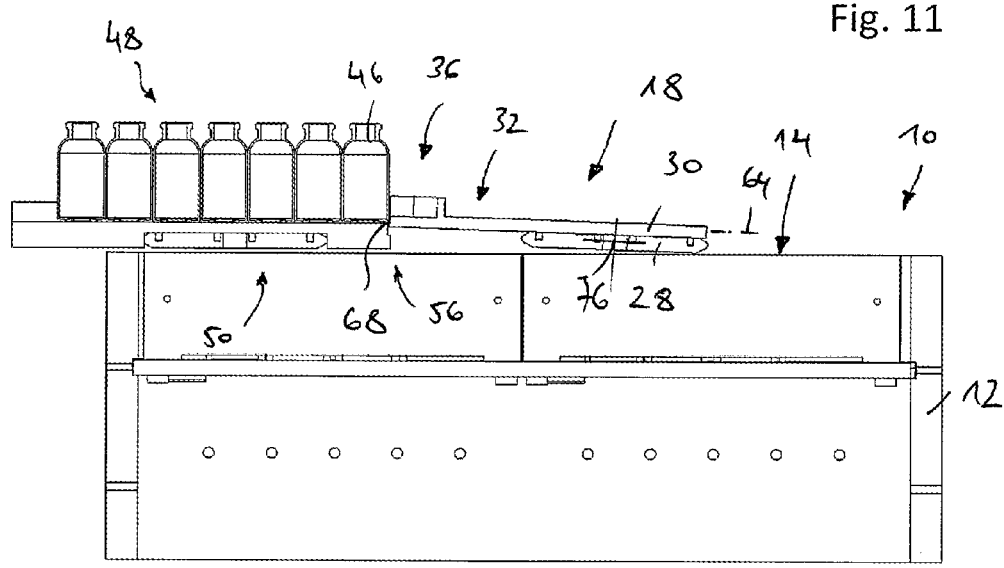
FIG. 12 shows a side view corresponding to FIG. 11.

The further transport mover 18 is preferably constructionally identical to the transport mover 16 and in particular likewise has a drive section 28 which interacts with the drive plane 14, wherein the drive section 28 bears a working platform 30 which protrudes over the drive section 28 preferably with a cantilever region 32, compare FIG. 12.

The transport movers 16 and 18 respectively have a receiving region 34, 36 which is preferably arranged in an edge region of the respective working platform 24, 30, in particular in an edge region of the respective cantilever region 26, 32.

The receiving regions 34, 36 respectively have a receiving surface 38, 40, compare FIG. 3. The receiving surfaces 38, 40 are divided by delimitations 42, 44 into partial surfaces which each permit one container 46 to be received. The plurality of containers 46 are part of a supply 48, compare FIG. 1.

The containers 46 of the supply 48 are provided on a feed device 50 which has at least one conveying channel 52 for preparing and for conveying containers 46.

The feed device 50 extends, as seen in a supply direction 70 of the containers 46 (compare FIG. 1), between an input 54 and a transfer end 56 for transferring containers 46 onto a receiving region 34 or 36 of a transport mover 16 or 18 (compare FIGS. 2 and 3).

The feed device 50 comprises an additional mover 58 which bears the at least one conveying channel 52 and which has a drive section 60 which likewise interacts with the drive plane 14, compare FIG. 2.

It is possible that the additional mover 58 is activated so as to vibrate and therefore provides a vibration device for transporting the containers 46 along the supply direction 70 and in the direction of the transfer end 56.

The working platforms 24, 30 of the transport movers 16, 18 extend substantially in each case within one plane 62, compare FIG. 2, or 64, compare FIG. 12. The respective working platforms 24, 30 have boundary surfaces (without reference signs) extending at an angle, in particular perpendicularly, to the respective planes 62, 64 and being circumferentially closed, wherein in each case one of the boundary surfaces forms a blocking surface 66, compare FIG. 2, or a blocking surface 68, compare FIG. 12. The blocking surfaces 66, 68 are each arranged at an angle, in particular perpendicularly, to the respective receiving surfaces 38, 40 and are adjacent to them.

For the following description of the operation of the transport system 10 it is assumed that the containers 46 of the supply 48 move in the supply direction 70 from the input 54 in the direction of the transfer end 56 and beyond the latter; for the movement of the transport movers 16 and 18, a movement direction 72 perpendicular thereto, compare FIG. 1, is assumed over various transport phases.

Figure 4:
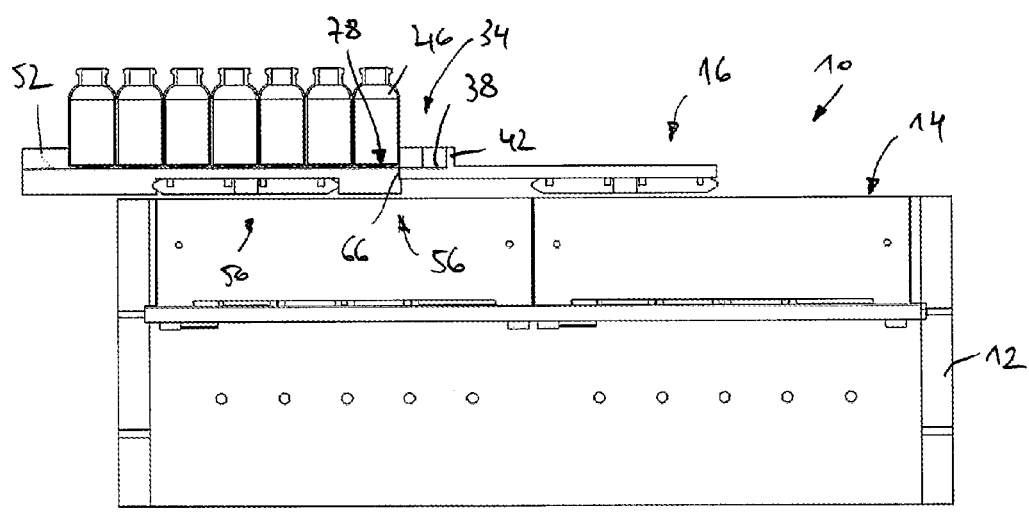
FIG. 4 shows a side view corresponding to FIG. 3.

FIGS. 3 and 4 show a first transport phase in which the receiving region 34 of the transport mover 16 is arranged adjacent to the transfer end 56 of the feed device 50. The receiving surface 38 of the transport mover 16 is empty. The blocking surface 66 of the transport mover 16 is in a transfer position.

The receiving surface 38 of the transport mover 16 is arranged at least substantially at the same height as a transfer surface 78 of the at least one conveying channel 52. At the same time, the blocking surface 66 is arranged at such a low level that a container 46 passes from the feed device 50 or the conveying channel 52 into the receiving region 34 from the transfer surface 78 beyond the blocking surface 66, compare FIGS. 5 and 6.

Figure 5:
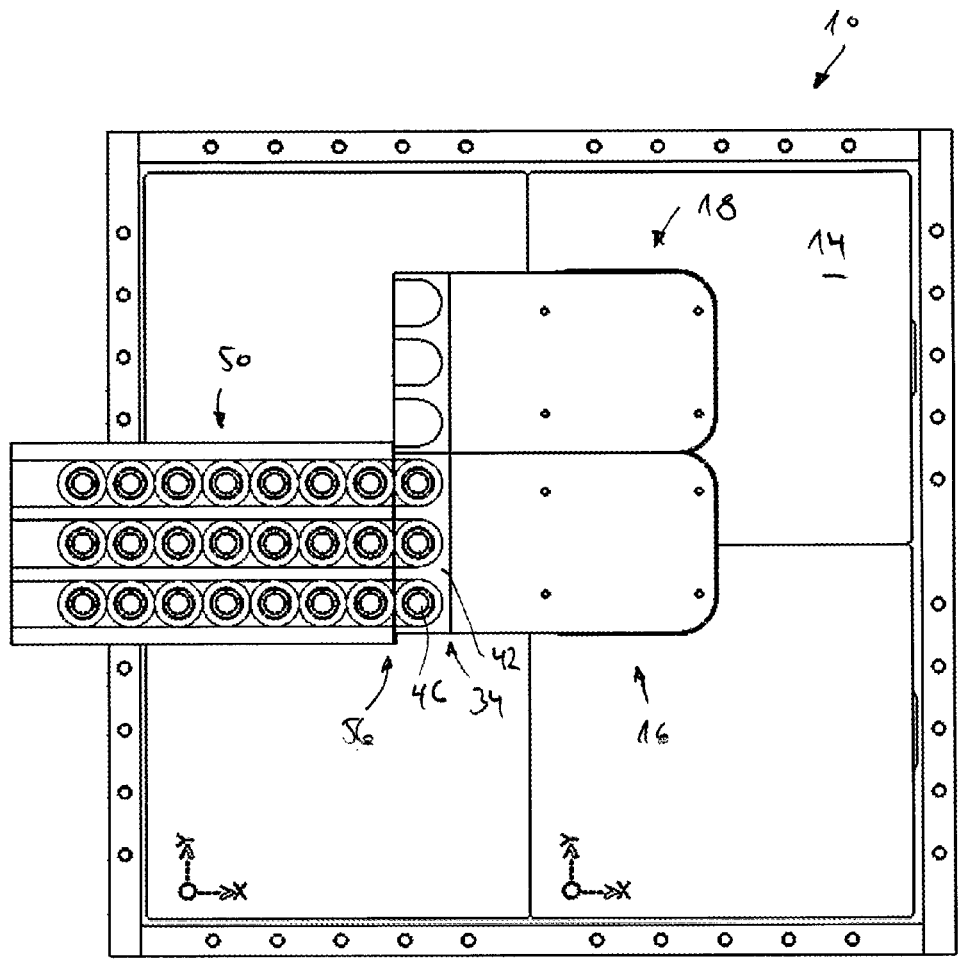
FIG. 5 shows a top view of the transport system according to FIG. 1 in a second transport phase.
Figure 6:
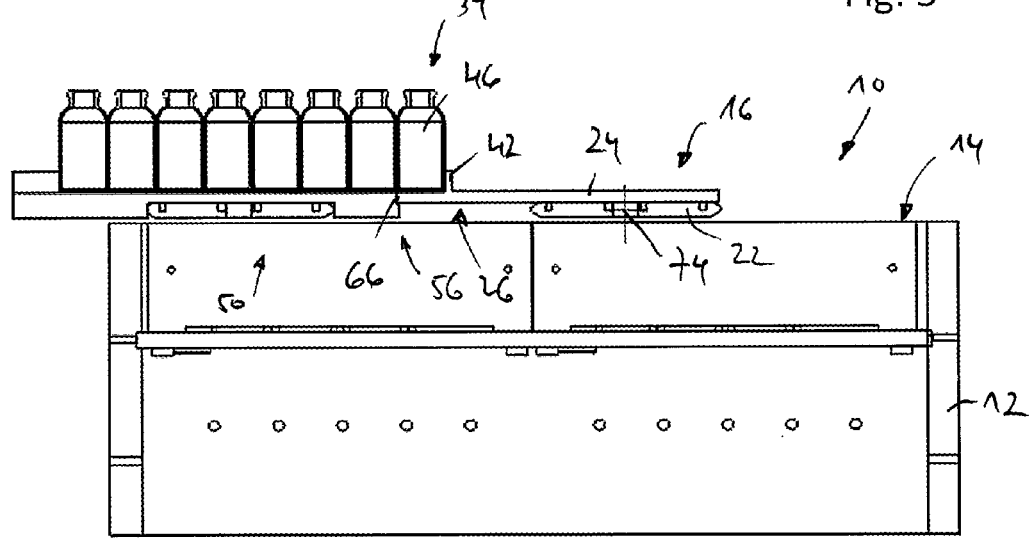
FIG. 6 shows a side view corresponding to FIG. 5.
Figure 7:
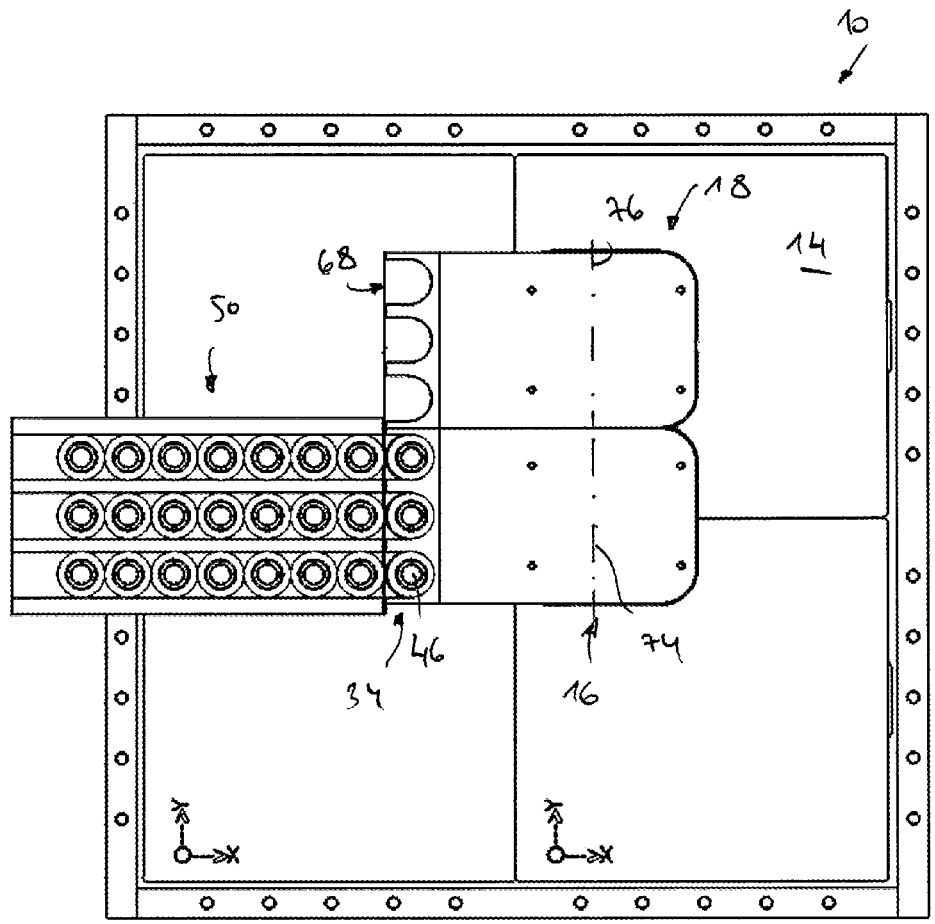
FIG. 7 shows a top view of the transport system according to FIG. 1 in a third transport phase.

In the state according to FIGS. 5 and 6, the supply 48 of containers 46 furthermore exerts a force on those containers 46 which are already disposed in the receiving region 34 of the transport mover 16. If, in this state, the transport mover 16 were to be moved away from the transfer end 56, there is the risk of following containers 46 being output beyond the transfer end 56 and then dropping in an uncontrolled manner onto the drive plane 14. To avoid this, the blocking surface 66 of the transport mover 16 is raised into a blocking position, compare FIGS. 7 and 8.

Figure 8:
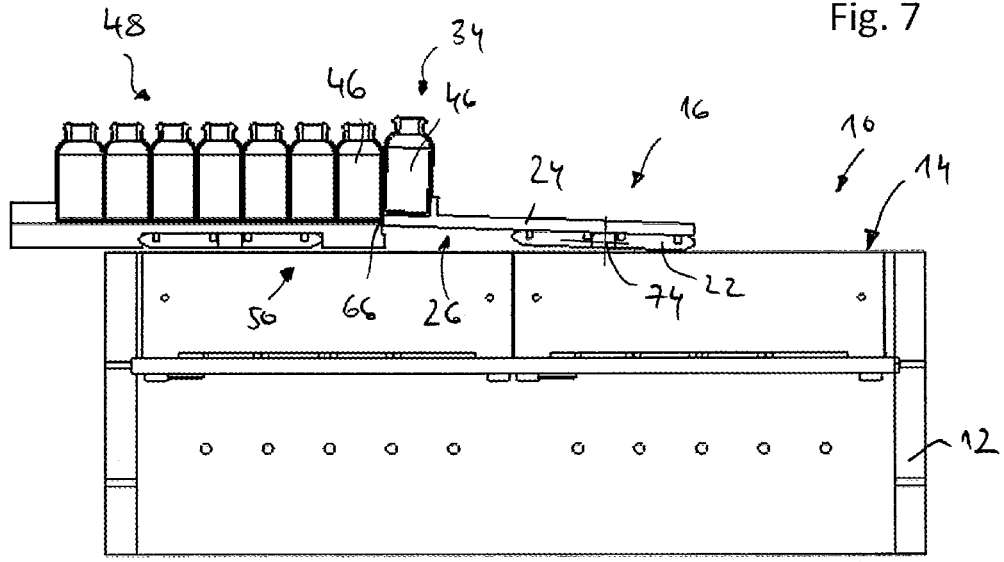
FIG. 8 shows a side view corresponding to FIG. 7.
Figure 9:
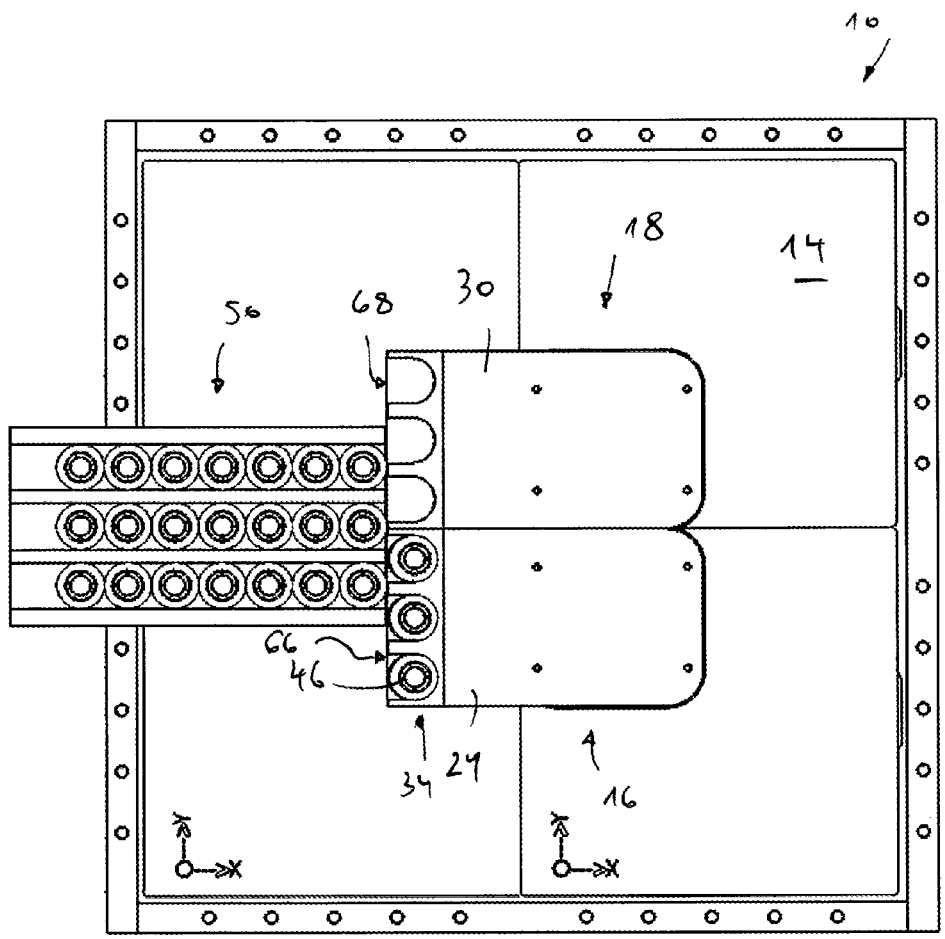
FIG. 9 shows a top view of the transport system according to FIG. 1 in a fourth transport phase.
Figure 10:
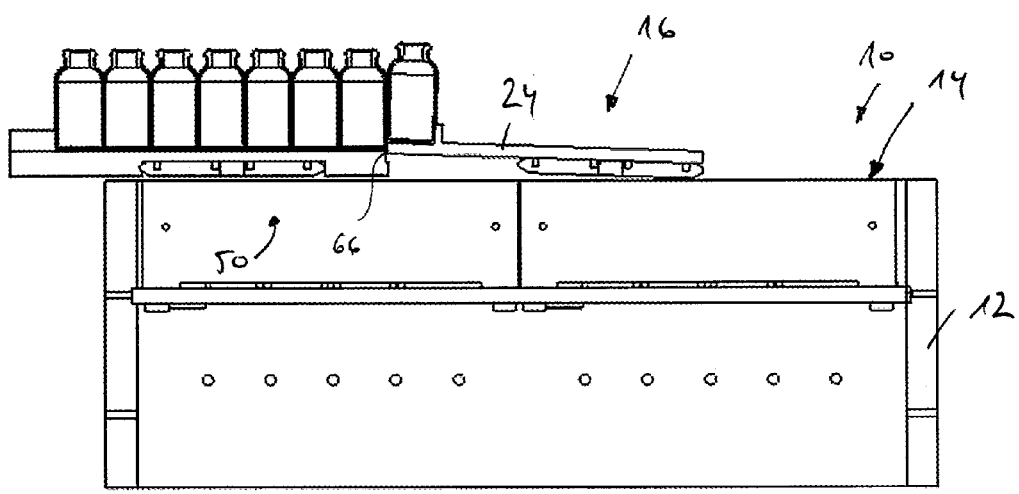
FIG. 10 shows a side view corresponding to FIG. 9.

In order to raise the blocking surface 66, the drive section 22 of the transport mover 16 is tilted about a tilting axis which is denoted by the reference sign 74 in FIGS. 6 and 8. This tilting movement is transmitted by the drive section 22 to the working platform 24 and also to the cantilever region 26 and finally to the blocking surface 66 until the latter has reached its blocking position. In this blocking position, the blocking surface 66 blocks containers 46 of the supply 48 that are disposed on the feed device 50 from moving in the direction of the receiving region 34 of the transport mover 16.

The further transport mover 18 has a corresponding tilting axis 76 such that the blocking surface 68 of the further transport mover 18 can be shifted in a corresponding manner between a transfer position and a blocking position. In the state illustrated in FIG. 7, the blocking surface 68 of the further transport mover 18 also assumes its (upper) blocking position.

Figure 11:
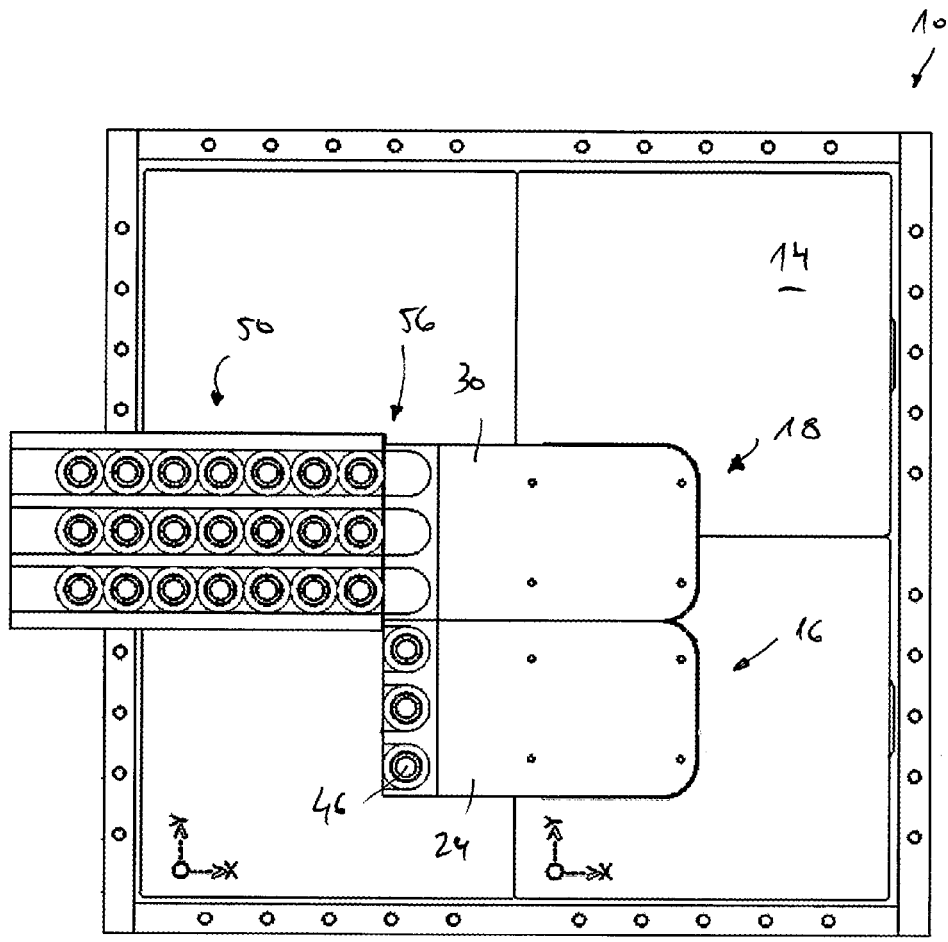
FIG. 11 shows a top view of the transport system according to FIG. 1 after the end of the fourth transport phase.

During subsequent transporting away of the containers 46 disposed in the receiving region 34 of the transport mover 16, the transport movers 16 and 18 move synchronously along the movement direction 72, compare FIG. 1. Since the respective blocking surfaces 66 and 68 of the two transport movers 16 and 18 are each in their blocking position, shifting of the transport mover 16 and removal of the blocking surface 66 are therefore accompanied by the fact that the blocking surface 68 of the further transport mover 18 maintains the blocking effect of the blocking surface 66 and finally completely replaces it, compare FIGS. 11 and 12 (in the illustration according to FIG. 12, the transport mover 16 together with containers 46 is not illustrated so as to illustrate the further transport mover 18).

In the state according to FIG. 12, the containers 46 of the supply 48 are secured against transfer beyond the transfer end 56 by means of the blocking surface 68 of the further transport mover 18. Tilting of the further transport mover 18 about its tilting axis 76 leads in a following state, not illustrated further in the drawing, to the blocking surface 68 being transferred from the blocking position into a transfer position, comparably to a state according to FIG. 4, and therefore, instead of the transport mover 16 illustrated in FIG. 4, the further transport mover 18 is ready for receiving containers 46, with containers 46 being transferred beyond the blocking surface 68 into the receiving region 36 of the further transport mover 18.

The steps explained above can be repeated in an alternating manner in each case for the transport movers 16 and 18, and therefore one of the transport movers 16, 18 is in each case ready for filling with containers 46 from the supply 48 and the in each case other of the transport movers 16, 18 is ready for transporting away a batch of containers 46.

What is claimed is:

1. A transport system (10) for a plurality of containers (46), the transport system (10) comprising: a feed device (50) for a supply (48) of containers (46) which, at a transfer end (56) of the feed device (50), can be received by a receiving region (34) of a working platform (24) of a transport mover (16), wherein, for the purpose of movement in a working plane (20) that is parallel to a stationary, planar drive plane (14), the transport mover (16) has a drive section (22) which is connected to the working platform (24) and which interacts contactlessly with the stationary, planar drive plane (14), wherein the working platform (24) has a blocking surface (66), the distance of which from the drive plane (14) can be changed by movement of the drive section (22) of the transport mover (16) relative to the drive plane (14), wherein, in a transfer position associated with a smaller distance from the drive plane (14), the blocking surface (66) is arranged at a low level such that transfer of containers (46) from the transfer end (56) of the feed device (50) beyond the blocking surface (66) into or onto the receiving region (34) of the working platform (24) is made possible, and wherein, in a blocking position associated with a greater distance from the drive plane (14), the blocking surface (66) blocks transfer of containers (46) from the transfer end (56) of the feed device (50) into or onto the receiving region (34) of the working platform (24).

2. The transport system (10) according to claim 1, wherein the change in the distance of the blocking surface (66) from the drive plane (14) is accompanied by a vertical movement of the transport mover (16) along a vertical axis of the transport mover (16) with respect to the drive plane (14).

3. The transport system (10) according to claim 1, wherein the change in the distance of the blocking surface (66) from the drive plane (14) is accompanied by a tilting movement of the transport mover (16) along a tilting axis (74) of the transport mover (16) parallel to the drive plane (14).

4. The transport system (10) according to claim 1, wherein the working platform (24) extends in a plane (62), and wherein the blocking surface (66) is oriented at an angle to said plane (62).

5. The transport system (10) according to claim 1, wherein the blocking surface (66) is a boundary surface of the working platform (24).

6. The transport system (10) according to claim 1, wherein the working platform (24) has a cantilever region (26) which protrudes over the drive section (22) and on which the blocking surface (66) is arranged.

7. The transport system (10) according to claim 1, wherein the receiving region (34) has a receiving surface (38) on which the containers (46) can be disposed, and wherein the blocking surface (66) is adjacent to the receiving surface (38).

8. The transport system (10) according to claim 1, wherein the blocking surface (66) and the receiving surface (38) are oriented at an angle to each other.

9. The transport system (10) according to claim 1, wherein the receiving region (34) has delimitations (42) for receiving separated containers (46).

10. The transport system (10) according to claim 1, wherein the feed device (50) has a vibration device for transporting the containers (46) in a direction of the transfer end (56).

11. The transport system (10) according to claim 1, wherein the feed device (50) is arranged on an additional mover (58) which is independent of the transport mover (16) and which interacts with the stationary, planar drive plane (14).

12. The transport system (10) according to claim 1, wherein the feed device (50) is designed as a conveying channel (52) or has at least one conveying channel (52).

13. The transport system (10) according to claim 1, wherein the transport system (10) has a further transport mover (18), wherein the containers can be received by a receiving region (36) of a working platform (30) of the further transport mover (18), wherein, for the purpose of movement in the working plane (20), the further transport mover (18) has a drive section (28) which is connected to the working platform (30) and which contactlessly interacts with the stationary, planar drive plane (14), wherein the working platform (30) has a blocking surface (68), the distance of which from the drive plane (14) can be changed by movement of the drive section (28) of the further transport mover (18) relative to the drive plane (14), wherein, in a transfer position associated with a smaller distance from the drive plane (14), the blocking surface (68) is arranged at a low level such that transfer of containers (46) from the transfer end (56) of the feed device (50) beyond the blocking surface (68) into or onto the receiving region (36) of the working platform (30) is made possible, and wherein, in a blocking position associated with a greater distance from the drive plane (14), the blocking surface (68) blocks transfer of containers (46) from the transfer end (56) of the feed device (50) into or onto the receiving region (36) of the working platform (30).

14. A method for transporting a plurality of containers (46), in which a feed device (50) provides a supply (48) of containers (46) which, at a transfer end (56) of the feed device (50), are received by a receiving region (34) of a working platform (24) of a transport mover (16), wherein, for the purpose of movement in a working plane (20) that is parallel to a stationary, planar drive plane (14), the transport mover (16) has a drive section (22) which is connected to the working platform (24) and which contactlessly interacts with the stationary, planar drive plane (14), wherein the working platform (24) has a blocking surface (66), the distance of which from the drive plane (14) is changed by movement of the drive section (22) of the transport mover (16) relative to the drive plane (14), wherein, in a transfer position associated with a smaller distance from the drive plane (14), the blocking surface (66) is arranged at a low level such that transfer of containers (46) from the transfer end (56) of the feed device (50) beyond the blocking surface (66) into or onto the receiving region (34) of the working platform (24) is made possible, and wherein, in a blocking position associated with a greater distance from the drive plane (14), the blocking surface (66) is arranged at a high level such that transfer of containers (46) from the transfer end (56) of the feed device (50) into or onto the receiving region (34) of the working platform (24) is blocked.

15. The method according to claim 14, wherein, at least in a transition state, transfer of containers (46) from the transfer end (56) into or onto the receiving region (34) of the working platform (24) is blocked by a plurality of adjacently arranged blocking surfaces (66, 68) of different transport movers (16, 18).

\* \* \* \* \*